United States Patent [19]
Kamata

[11] Patent Number: 5,805,934
[45] Date of Patent: Sep. 8, 1998

[54] LENS-FITTED PHOTO-FILM UNIT AND METHOD OF PRODUCING THE SAME

[75] Inventor: Kazuo Kamata, Kanagawa, Japan

[73] Assignee: Fuji Photo Film Co., Ltd., Kanagawa, Japan

[21] Appl. No.: 736,011

[22] Filed: Oct. 23, 1996

[30] Foreign Application Priority Data

Oct. 23, 1995 [JP] Japan .................................. 7-274112

[51] Int. Cl.⁶ .................................................. G03B 17/02
[52] U.S. Cl. ............................... 396/6; 396/60; 396/311
[58] Field of Search ................................. 396/6, 60, 311; 430/496

[56] References Cited

U.S. PATENT DOCUMENTS

| | | |
|---|---|---|
| 4,370,409 | 1/1983 | Bostroem . |
| 4,553,833 | 11/1985 | Kanaoka et al. . |
| 4,554,560 | 11/1985 | Kanaoka et al. . |
| 4,577,961 | 3/1986 | Terashita . |
| 4,965,628 | 10/1990 | Olliver et al. . |
| 5,343,265 | 8/1994 | Oi et al. .................................. 396/378 |
| 5,525,459 | 6/1996 | Peterson .................................. 430/496 |

FOREIGN PATENT DOCUMENTS 0 503 510  9/1992  European Pat. Off. .

*Primary Examiner*—Russell E. Adams
*Attorney, Agent, or Firm*—Young & Thompson

[57] ABSTRACT

A lens-fitted photo film is pre-loaded with a photo film. Imaging frames are created on the photo film by a shutter releasing. There is aspect ratio information optically prerecorded on the photo film in an outside of the imaging frames, and associate with a respective one of the imaging frames. The aspect ratio information includes two dots, and represents an aspect ratio in two bits. The imaging frames are printed in accordance with the aspect ratio. The lens-fitted photo film unit has a viewfinder with a view field of the aspect ratio represented by the aspect ratio information.

6 Claims, 5 Drawing Sheets

F I G. 1
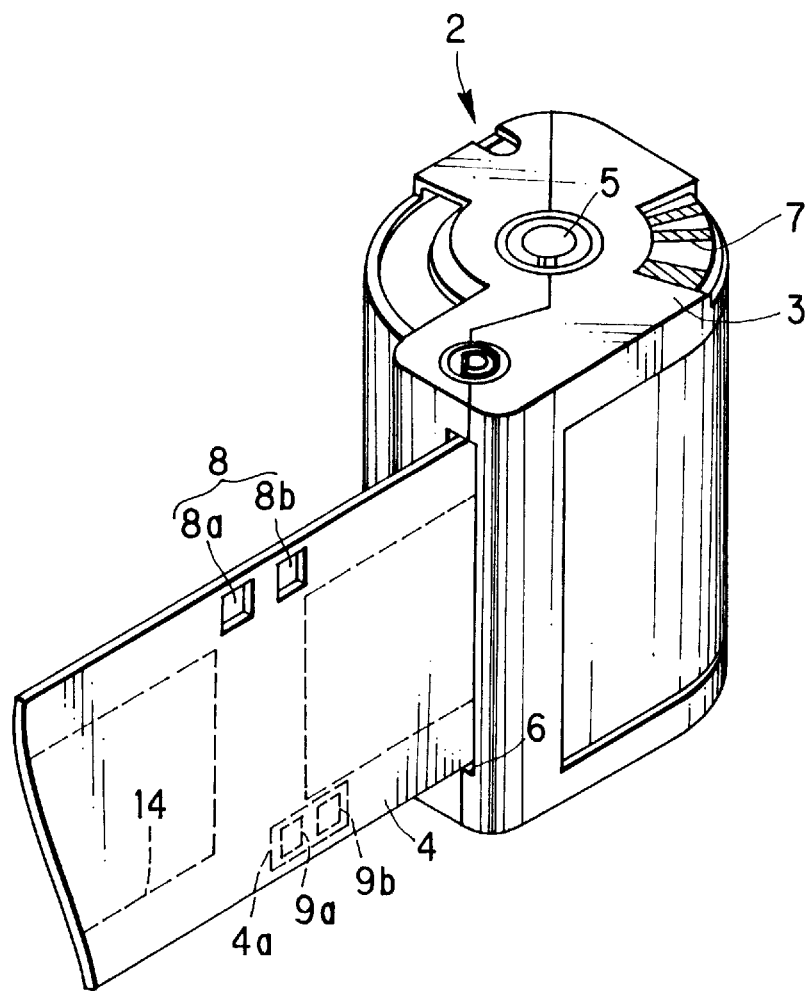

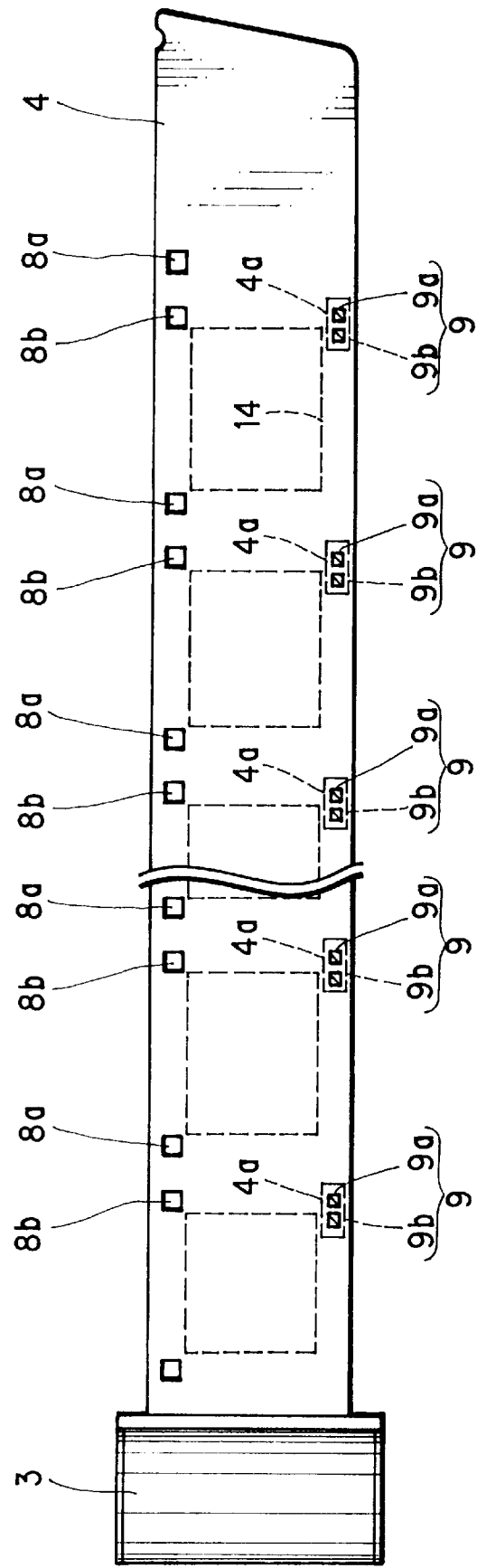

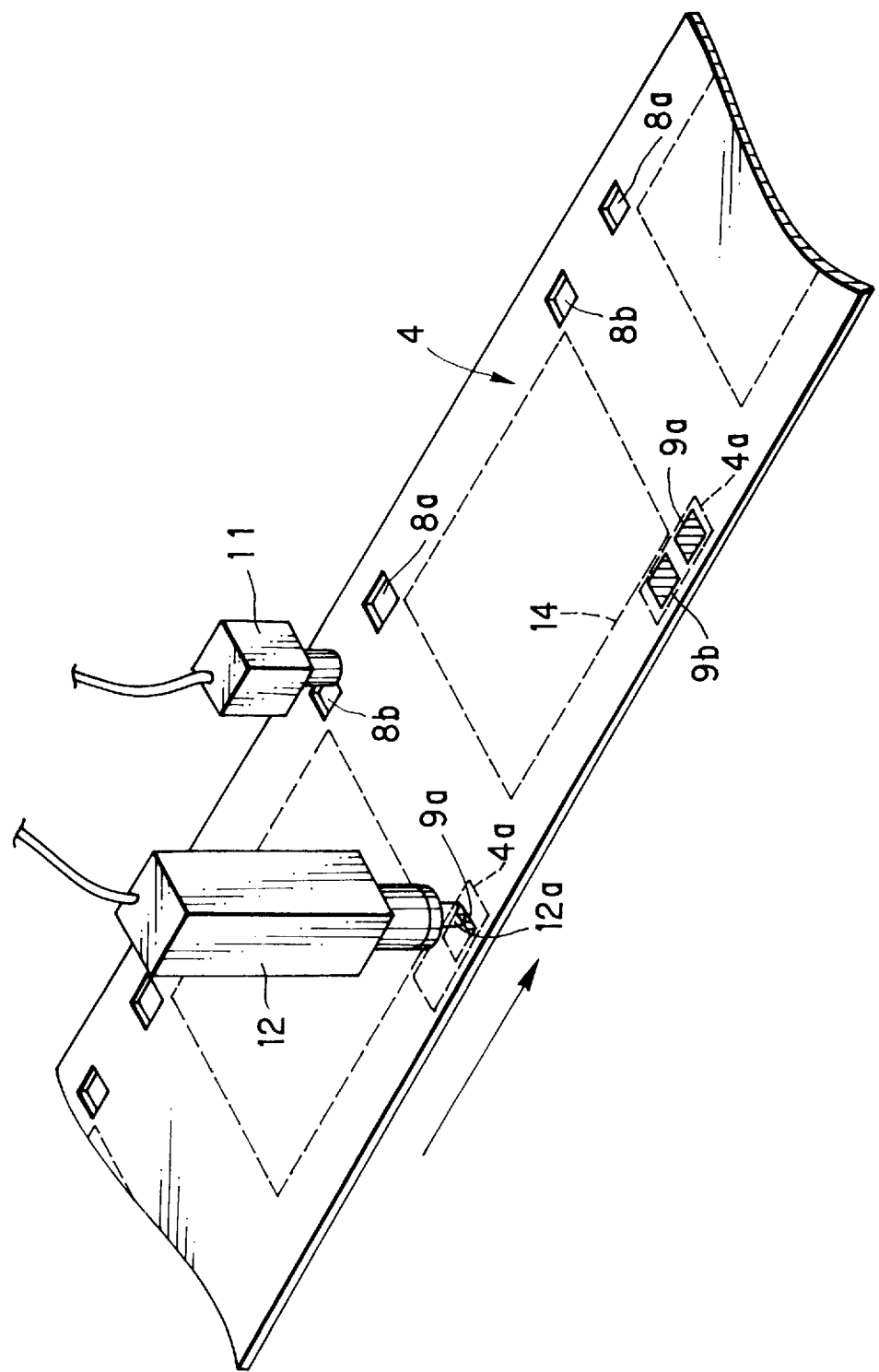

F I G. 3A
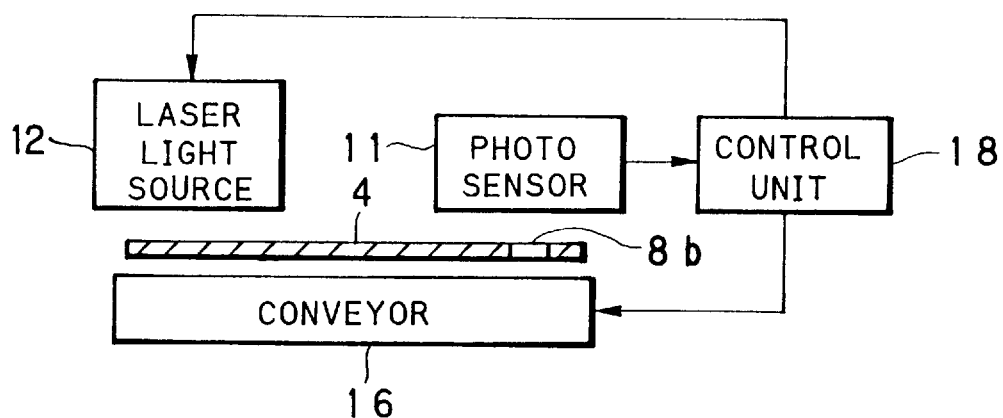

LENS-FITTED PHOTO-FILM UNIT AND METHOD OF PRODUCING THE SAME

BACKGROUND OF THE INVENTION

1. Field of the Invention

The present invention relates to a lens-fitted photo film unit and a method of producing the same. More particularly, the present invention relates to a lens-fitted photo film unit in which aspect ratio information is provided for a photo film to be used in producing photographic prints from the photo film, and a method producing the same.

2. Description Related to the Prior Art

Photographic prints having various aspect ratios are produced and supplied commercially, for versatile attraction and enjoyment of taking photographs on the side of a user of a camera or a lens-fitted photo film unit. The aspect ratio are set selectable in consideration of kinds of photographic subjects and their sizes. Examples of the photographic prints are a panoramic print (89×252 mm), a wide-vision print (89×158 mm) and a C-size print (89×127 mm) which is the most prevalent standard print. The panoramic print is two times as long horizontally as the C-size print. The wide-vision print has an aspect ratio similar to that of high-definition television (HDTV).

To obtain the photographic prints having the various aspect ratios, there is a method in which an exposure range on photo film is restricted in the course of exposure by light-shielding plates or the like incorporated in the camera or the lens-fitted photo film unit, and the photo film having the exposure range being varied is subjected to printing operation to obtain the photographic prints of printing modes in the above-described manner. Examples of the exposure range are a panoramic exposure range (13×36 mm), a wide-vision exposure range (20×36 mm) and a C-size exposure range (24×36 mm).

There is a problem of high cost in the manufacture of the camera or the lens-fitted photo film unit, because the light-shielding plates and mechanism for changing over the light-shielding plates must be added to the camera or the lens-fitted photo film unit. The problem is the more serious in view of features of the compact camera or the lens-fitted photo film unit, which should be typically inexpensive and should have a simplified construction.

There is another suggestion for obtaining the photographic prints of the printing modes without adding any mechanism to the camera or the lens-fitted photo film unit. In taking exposures, all the imaging frames are recorded in the exposure range commonly determined at a fixed format. In a photo laboratory, only a restricted range inside the exposure range being fixed is printed according to each of the printing modes. Results of this suggestion is similar to that of the above technique where the exposure range on the photo film is varied.

To produce the photographic prints according to the printing modes from the exposure range of the single kind on the photo film, selected ones of the imaging frames for the printing modes as desired must be designated by the user and recorded by a photofinishing agent, who must accomplish extra manual operation for it. It is further likely that an operator of the photofinishing agent misreads the printing modes as designated, to produce wrong photographic prints.

SUMMARY OF THE INVENTION

In view of the foregoing problems, an object of the present invention is to provide a lens-fitted photo film unit incorporating photo film which can be easily and correctly handled in printing operation, and a method of producing the same.

Another object of the present invention is to provide a lens-fitted photo film unit incorporating photo film which has aspect ratio information compatible with a system commonly applied to cameras and other optical instruments, and a method of producing the same.

In order to achieve the above and other objects and advantages of this invention, aspect ratio information is optically prerecorded on the photo film in an outside of the imaging frames, and associated with a respective one of the imaging frames. The aspect ratio information includes at least two indicia, and represents an aspect ratio in at least two bits. The imaging frames are printed in accordance with the aspect ratio. The viewfinder has a view field of the aspect ratio represented by the aspect ratio information.

In a preferred embodiment, the indicia are respectively dots. The aspect ratio is 1.4–1.5.

To produce the lens-fitted photo film unit, a producing method includes a step of optically prerecording the aspect ratio information on the photo film in the outside of the imaging frames and in association with a respective one of the imaging frames.

The optical prerecording step includes conveying the photo film, and driving a light source while the photo film is conveyed, the light source being disposed in a direction toward the outside of the imaging frames, for recording the indicia photographically.

The indicia are respectively rectangular.

The photo film includes a train of perforations formed on a side opposite to the aspect ratio information and outside the imaging frames, at least one of the perforations being associated with a respective one of the imaging frames. A respective one of the perforations is detected in the photo film being conveyed, the light source being driven in response to the detection while the photo film is conveyed continuously.

In accordance with the present invention, the photo film in the lens-fitted photo film unit can be easily and correctly handled in printing operation.

In the prior art, there is still another suggestion to provide a data imprinting device, which includes: plural data light paths for introducing ambient light to the photo film; a light path selector plate, associated with a shift of a view field changer mechanism of the viewfinder, for selectively blocking the data light paths; and a light path shutter moved into and out of the data light paths in association with movement of the shutter mechanism with a shutter blade.

According to the suggestion, two imprinting devices are arranged for providing the photo film with one or two rectangular dots of latent images. Combinations of existence/absence of the dots are two-bit data, which can be is any of three kinds and designates the printing modes.

The most prevalent models of the lens-fitted photo film unit, however, are types of an L-size, which is adapted only to a printing size of which the aspect ratio is 1.43. Of course there are a type of a panoramic size adapted to a printing size of which the aspect ratio is 1.85, and a changeable type of the L-size and panoramic size. However the panoramic and changeable types being available have only small percentage commercially in the market.

If the lens-fitted photo film unit, specialized for the L-size and widely sold in the market, is provided with an additional structure of the data imprinting device, the dots are imprinted repetitively in an unchanged manner. The data imprinting device, being capable of selectively recording one arrangement of the dots, may not be effectively utilized, and inconsistent to keeping low the cost of the lens-fitted photo film unit. The data imprinting device is obliged to have a complicated structure, and is likely to have low reliability in operation.

The present invention is effective in overcoming those problems, as the lens-fitted photo film unit does not require a data imprinting device. The dots are imprinted in a simpler manner than by use of a data imprinting device. The aspect ratio information of the photo film in the lens-fitted photo film unit is compatible with the system commonly applied to cameras and other optical instruments.

BRIEF DESCRIPTION OF THE DRAWINGS

The above objects and advantages of the present invention will become more apparent from the following detailed description when read in connection with the accompanying drawings, in which:

FIG. 1 is a perspective, partially broken, illustrating a photo film cassette;

FIG. 2 is a plan illustrating the photo film cassette of which photo film is pulled out;

FIG. 3 is a perspective illustrating a laser light source and a photo sensor in combination with the photo film;

FIG. 3A is a block diagram illustrating an apparatus including the laser light source and the sensor, for imprinting aspect ratio information.

DETAILED DESCRIPTION OF THE PREFERRED EMBODIMENT(S) OF THE PRESENT INVENTION

Figure 4:
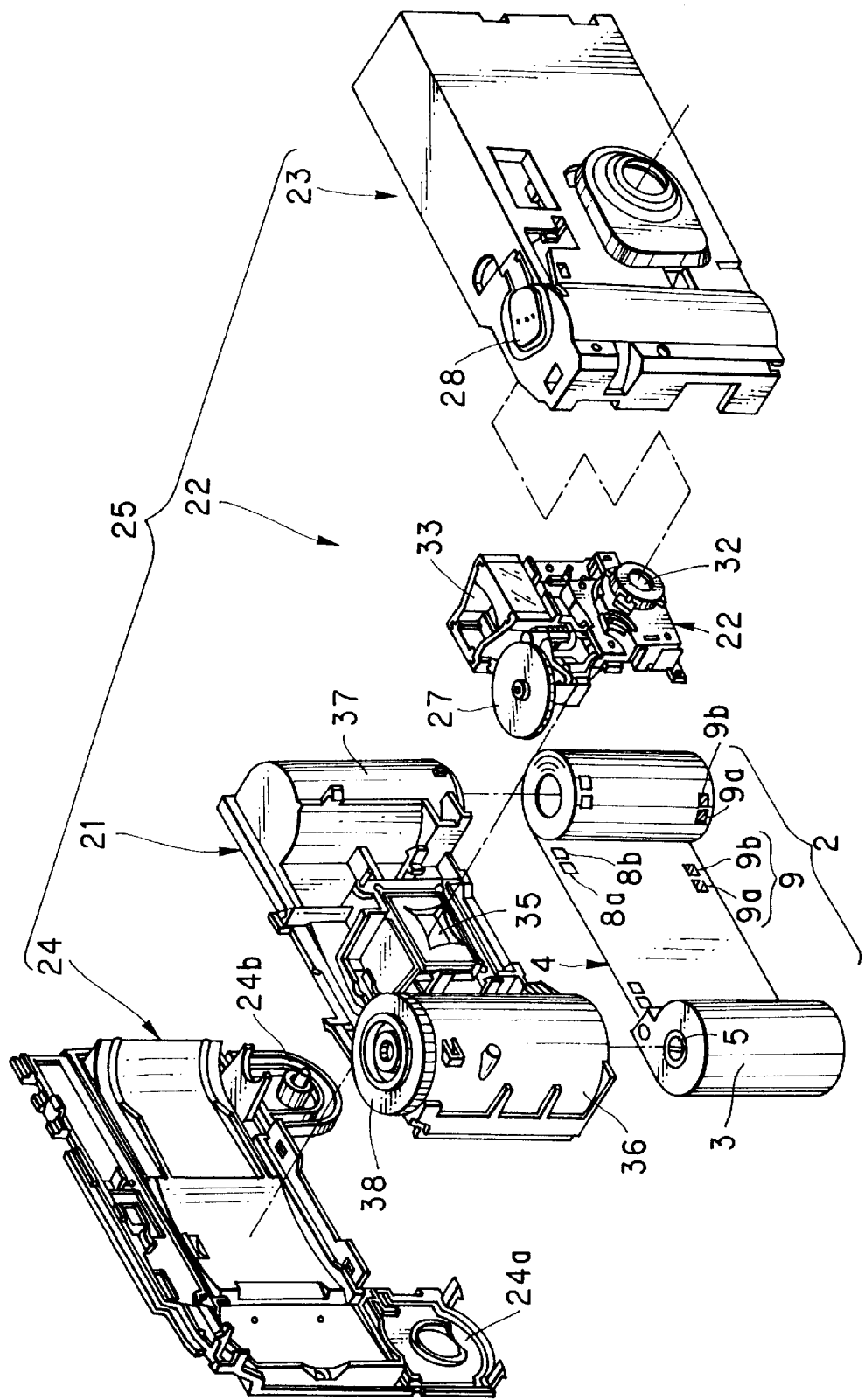
FIG. 4 is an exploded perspective illustrating a photo film unit of the present invention.

In FIG. 1, a photo film cassette 2 is constituted by a cassette shell 3 and a photo film 4. A spool 5 is rotatably contained in the cassette shell 3, and has the photo film 4 wound in a roll form thereon. Also the photo film cassette 2 has a photo film passageway 6 and a portion with a bar code 7. Through the passageway 6 is passed the photo film 4. The bar code 7 represents information specific to the photo film cassette 2. The photo film cassette 2 is basically the same as that disclosed in the commonly assigned patent application U.S. Ser. No. 08/596,660.

In FIG. 2, the photo film 4 has imaging frames 14 and perforations 8. Each one of the imaging frames 14 is associated with two of the perforations 8, namely a first perforation 8a and a second perforation 8b. The perforations 8a and 8b are spaced at a small interval. The second perforation 8b is located away from the first perforation 8a in the direction toward the cassette shell 3, and is formed at a respective first shorter side of the imaging frames 14. On a side opposite to the second perforation 8b, aspect ratio information 9 is recorded in a recording region 4a associated with each of the imaging frames 14. Two rectangular dots are recordable to the recording region 4a photographically in a form of latent image. The aspect ratio information 9 is two-bit data designating a printing mode.

The aspect ratio information 9 consists of a combination of a first dot 9a and a second dot 9b, each of which is a digit of 2-bit data. Prior to including the photo film cassette 2 into a lens-fitted photo film unit, the dots 9a and 9b are recorded to the recording region 4a of the photo film 4 for all of the imaging frames 14.

The dots 9a and 9b are recorded as illustrated in FIGS. 3 and 3A. The photo film 4 is conveyed by a conveyor 16 at a regular speed, while the second perforation 8b is detected by a sensor 11, for example a photo sensor. A laser light source 12 is controlled by a control unit 18, to apply a slit beam 12a for a predetermined duration so as to record the dots 9a and 9b in the recording region 4a.

As illustrated in FIG. 2, the dots 9a and 9b of the aspect ratio information 9 are preexposed on the recording region 4a for the photo film 4 on the side opposite to the second perforation 8b. A light-tight dark room is used to record the aspect ratio information 9.

FIG. 4 illustrates the lens-fitted photo film unit, which is predetermined to contain the photo film cassette 2 with the dots 9a and 9b on the photo film 4. The lens-fitted photo film unit consists of a photo film housing 25 and a cardboard wrapper (not shown) for wrapping the photo film housing 25. The photo film housing 25 includes a photo film containing section 21, an exposure section 22, a front cover 23 and a rear cover 24. The photo film containing section 21 contains the photo film cassette 2.

In the top of the front cover 23, a frame counter disk 27 is partially exposed outside. A release button 28 is formed integrally with the top of the front cover 23. In the front of the front cover 23, a taking lens 32 and a viewfinder 33 appear. The viewfinder 33 has a fixed view field having a width-to-length aspect ratio of 1.43, which corresponds to an L-size printing mode.

The photo film containing section 21 has a cassette containing chamber 36 and a photo film roll chamber 37. An exposure aperture 35 and the exposure section 22 are disposed between the cassette containing chamber 36 and the roll chamber 37. The cassette containing chamber 36 contains the cassette shell 3 of the photo film cassette 2. The roll chamber 37 contains a roll of the photo film 4 having the dots 9a and 9b previously recorded.

A winding wheel 38 is mounted on the top of the cassette containing chamber 36, and is meshed with the spool 5 in the cassette shell 3 for winding the photo film 4 into the cassette shell 3. The rear cover 24 covers the rear of the photo film containing section 21 wholly in light-tight fashion. A bottom of the rear cover 24 has a bottom lid 24a for closing the cassette containing chamber 36 and a bottom lid 24b for closing the roll chamber 37.

Operation of the above lens-fitted photo film unit is described now. Before the manufacture, the dots 9a and 9b are recorded into the recording region 4a on the photo film 4. The photo film 4 will be later included in the photo film cassette 2 to be contained in the photo film housing 25.

In FIGS. 3 and 3A, the photo film 4 is conveyed by the conveyor 16 in the dark room continuously at the constant speed. An edge of the second perforation 8b along the first shorter side of the photo film 4 is detected by the sensor 11. Upon the detection of the second perforation 8b, the laser light source 12 is driven for a predetermined duration to apply the slit beam 12a on the side of the photo film 4 opposite to the perforations 8. In FIG. 2, the first dot 9a as one first bit in the aspect ratio information 9 is recorded on the side opposite to the second perforation 8b.

After recording the first dot 9a, predetermined time lapses. Then the laser light source 12 is driven for a predetermined duration to apply the slit beam 12a to the photo film 4. The second dot 9b as one second bit in the aspect ratio information 9 is recorded on the side opposite to the second perforation 8b. Then the aspect ratio information 9 is entirely recorded or imprinted to the photo film 4.

Repeated operation causes the photo film 4 to have the aspect ratio information 9 associated with all of the imaging frames 14, so that the photo film 4 has the signs for instructing use of the L-size in the printing operation for any of the imaging frames 14.

The slit beam 12a is applied to the photo film 4 for the regular durations while the photo film 4 is conveyed at the regular speed, for the purpose of recording the dots 9a and 9b. This is very effective in heightening productivity of the photo film 4 for the photo film cassette 2 in view of the cost, as compared with a technique in which the slit beam 12a would be applied through a rectangular mask opening while the photo film 4 is stopped for each of the imaging frames 14.

A trailer of the photo film 4 having the dots 9a and 9b is retained to the spool 5 in the cassette shell 3. The photo film 4 is wound into the cassette shell 3 by rotation of the spool 5. The photo film containing section 21 having been provided with the exposure section 22 and the front cover 23, the cassette shell 3 is inserted into the cassette containing chamber 36 of the photo film containing section 21, at the same time as the photo film 4 is inserted into the roll chamber 37.

When the photo film cassette 2 with the dots 9a and 9b recorded is contained in the photo film containing section 21, the rear cover 24 is fitted on the rear of the photo film containing section 21. The bottoms of the cassette containing chamber 36 and the roll chamber 37 are respectively covered by the bottom lids 24a and 24b in light-tight fashion. The cardboard wrapper (not shown) is fitted about the photo film housing 25, finally to obtain the lens-fitted photo film unit.

To use the above-constructed lens-fitted photo film unit, the winding wheel 38 is rotated first. The photo film 4 is wound until a first one of the imaging frames 14 of the photo film 4 is set on the exposure aperture 35. A shutter device is charged responsively.

The user observes a photographic subject through the viewfinder 33, and checks that the subject is situated inside the view field of the viewfinder 33 for the L-size. Then the user depresses the release button 28 calmly in consideration of preventing shakes of the camera. Then the shutter device is actuated to take an exposure in one of the imaging frames 14 and record the subject image on it.

On the photo film 4, the dots 9a and 9b are previously recorded. Therefore no mechanism for data imprinting is needed in the lens-fitted photo film unit for the purpose of recording the dots 9a and 9b in the course of taking exposures.

Accordingly the lens-fitted photo film unit can be produced at a low cost. It is possible to avoid lowering reliability in adding a data imprinting mechanism.

The lens-fitted photo film unit, after all the imaging frames 14 are exposed, is forwarded to a photo laboratory, where photographic prints are produced from the imaging frames 14 all at the L-size. Some of the imaging frames 14 may be printed at a panoramic size or a wide-vision size (HDTV size) if the user requests it. For this, selected ones of the imaging frames 14 for the special size may be designated and recorded in an order form of the photo laboratory, where an operator manually designates the selected ones of the imaging frames 14 in the printing operation.

In the above embodiment, the dots 9a and 9b are recorded to the photo film 4 before the photo film 4 is retained to and included in the photo film cassette 2. The present invention is applicable to a method in which the photo film cassette 2 having the photo film 4 is prepared, and the photo film 4 is pulled and unwound out of the photo film cassette 2, and is provided with the dots 9a and 9b by recording operation, and then the photo film cassette 2 with the photo film 4 is inserted into a housing of the lens-fitted photo film unit.

In the above embodiment, the plural sets of the dots 9a and 9b are recorded in the order from the leader to the trailer of the photo film 4. The present invention is also applicable to producing method and apparatus in which the plural sets of the dots 9a and 9b are recorded in an order from the trailer to the leader of the photo film 4.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An apparatus for producing a lens-fitted photo film unit having a body, a viewfinder disposed in said body, and a photo film pre-loaded in said body, wherein imaging frames are created on said photo film by a shutter releasing, said producing apparatus comprising:

a conveyor for conveying said photo film to be contained in said lens-fitted photo film unit;

a light source disposed in a direction toward an outside of said imaging frames; and a control unit for controlling said conveyor and said light source in synchronism, said control unit driving a light source while said photo film is conveyed, for optically recording aspect ratio information on said photo film in said outside of each of said imaging frames and in association with respective ones of each of said imaging frames, said aspect ratio information including at least two indicia, and representing an aspect ratio in at least two bits, said imaging frames being printed in accordance with said aspect ratio.

2. A producing apparatus as defined in claim 1, wherein said indicia are respectively dots.

3. A producing apparatus as defined in claim 2, wherein said photo film includes a train of perforations formed on a side opposite to said aspect ratio information and outside said imaging frames, at least one of said perforations being associated with a respective one of said imaging frames;

further comprising a sensor, disposed in a direction toward said perforations in said photo film conveyed on said conveyor, for detecting a respective one of said perforations;

said control unit driving said light source in response to a signal from said sensor while said photo film is conveyed continuously.

4. A producing apparatus as defined in claim 3, wherein said indicia are respectively rectangular.

5. A producing apparatus as defined in claim 4, wherein two adjacent ones of said perforations are associated with a respective one of said imaging frames, and are cyclically arranged at a pitch of said imaging frames;

said control unit effects a sequence for driving said light source each time two of said perforations are detected, said light source being driven two times during said sequence.

6. A producing apparatus as defined in claim 5, wherein said aspect ratio is 1.4–1.5.

* * * * *